Oct. 2, 1951 C. E. YOUNG 2,569,626

STABILIZATION NETWORK

Filed Oct. 11, 1945 2 Sheets-Sheet 1

Inventor
CHARLES E. YOUNG

By [signature]

Attorney

Oct. 2, 1951 C. E. YOUNG 2,569,626

STABILIZATION NETWORK

Filed Oct. 11, 1945 2 Sheets-Sheet 2

Inventor
CHARLES E. YOUNG

By Ralph L. Chappell

Attorney

Patented Oct. 2, 1951 2,569,626

UNITED STATES PATENT OFFICE 2,569,626

STABILIZATION NETWORK

Charles E. Young, United States Navy

Application October 11, 1945, Serial No. 621,654

7 Claims. (Cl. 250—20)

Figure 1:
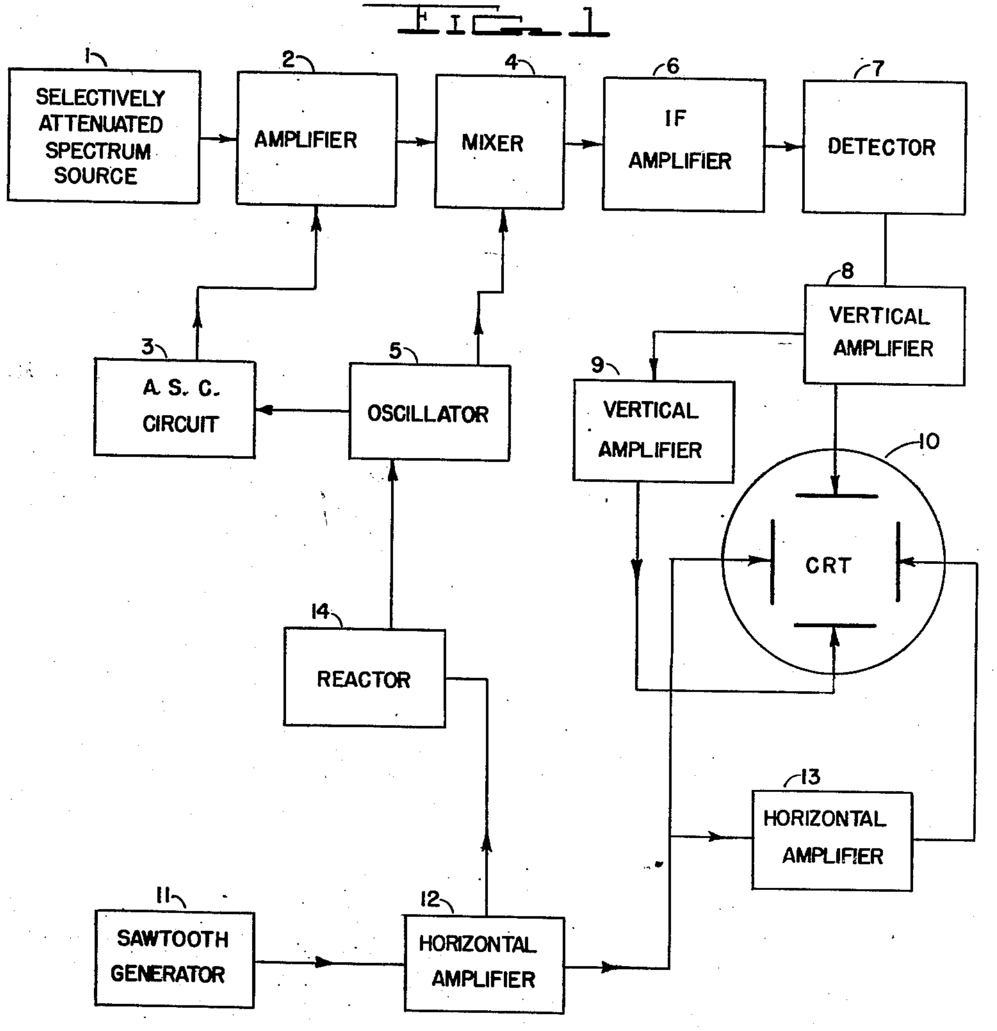

(Granted under the act of March 3, 1883, as amended April 30, 1928; 370 O. G. 757)

This invention relates to panoramic or frequency scanning devices and is particularly directed to a means of bandpass compensation for frequency selective circuits in such devices.

In frequency scanning receivers it is desirable that signals of various frequencies be presented in such a way that the amplitude of signals presented be proportional to signal strength at the receiver antenna. To accomplish this, some type of bandpass compensation is employed to provide for the selectivity of frequency selective circuits. The compensation is best provided for by applying a variable bias to an amplifier in the receiver as the frequency band is being swept.

In some applications it is necessary to vary the shape of the bias waveform in order to compensate for changing conditions of receiver selectivity. The input to a visual scanning adaptor, for example, is the selectively attenuated I.-F. output of a companion receiver. As the companion receiver is tuned to various frequencies, the selectivity curve of the I.-F. output changes. It is desirable in such a case to be able to supply a bias waveform that is readily adjustable to compensate for various conditions of circuit selectivity. The maximum amplitude of the bias waveform should be held constant as its shape changes.

It is accordingly an object of this invention to provide a means of bandpass compensation which is readily adjusted to different conditions of circuit selectivity.

It is another object of the invention to provide a means of bandpass compensation which automatically adjusts the amount of compensation as the nature of the compensation is varied.

It is another object of the invention to provide a variable transmission characteristic broad band transmission network with stabilized center frequency amplitude.

The invention will be further understood with reference to an exemplary embodiment shown in the drawing in which:

Fig. 1 shows in block diagram a typical visual scanning device employing the means of bandpass compensation to be claimed.

Figure 2:
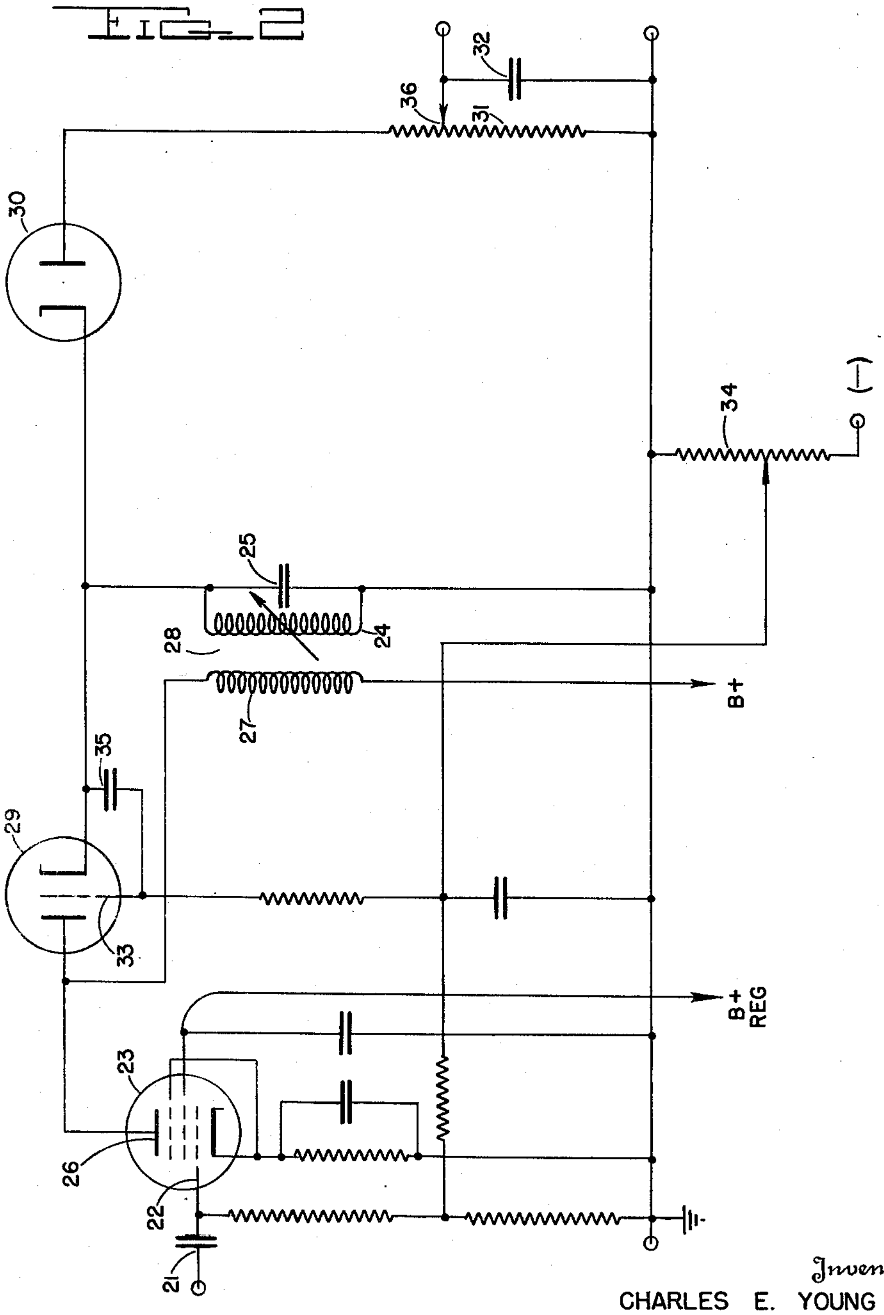

Fig. 2 shows in circuit diagram the automatic selectivity control (A. S. C.) circuit, to furnish a bias voltage.

In Fig. 1, a selectively attenuated spectrum is obtained from source 1 and amplified by amplifier 2. The amplifier gain is varied by circuit 3 in such a manner as to simulate the inverse band pass characteristic of the circuits which had previously attenuated the spectrum. The output of the amplifier 2 is fed to the mixer 4 where it beats with the signal from oscillator 5 whose frequency is recurrently varied, ordinarily in proportion to time. The I.-F. output of the mixer then varies with time. These signals whose time of appearance depends on frequency are amplified by circuit 6, demodulated by circuit 7 and applied through amplifiers 8 and 9 to the vertical plates of a cathode ray tube 10.

The sawtooth waveform from generator 11 is fed through amplifiers 12 and 13 to the horizontal plates of the oscilloscope, in order to cause the electron beam to periodically sweep across the screen with uniform speed. The waveform from the sawtooth generator, working through amplifier 12, is also used to vary the bias of the reactor tube 14. The reactor tube is coupled with the parallel resonant circuit of oscillator 5 in such a manner as to vary the oscillator frequency as the bias on the reactor is changed. Since the output of the sawtooth generator is used both to vary the frequency of the local oscillator and to move the beam of the oscilloscope horizontally across the screen, signals will appear on the screen in a horizontal position depending on their frequency.

Block 3 of Fig. 1 is represented in circuit schematic in Fig. 2. It supplies the A. S. C. voltage used to vary the gain of amplifier 2 as the frequency band is swept.

Referring now more particularly to the circuit shown in Figure 2, the output of the local oscillator 5 of Fig. 1 is introduced through condenser 21 to the grid 22 of isolating amplifier 23. The tuned circuit 24, 25 is coupled to the plate 26 of amplifier 23 by means of transformer 28 and also directly through tube 29. Circuit 24, 25 is tuned to the center frequency of the local oscillator excursion and attenuates signals on either side of the center frequency. This A.-C. voltage is rectified by diode 30, filtered by network 31 and 32 and applied as bias to the amplifier 2 of Fig. 1. At low frequencies where the signal strength at input of amplifier 2 is low, the bias applied will be low, at center frequencies where the signal amplitude is high, the bias will be high, and at higher frequencies where the signal strength is low the bias will be low. Hence the bias applied can be made to compensate for the manner in which the input to the amplifier had been attenuated.

Different conditions of selectivity in the input circuits to the panoramic device will require different bias voltage waveforms. To this end, tube 29 acts as a variable resistance effectively in parallel with the tuned circuit to vary the Q of the circuit. The plate cathode resistance of tube 29 is varied by changing the bias on its grid 33 by means of potentiometer 34. Lower bias on tube 29, for example, means lower tube resistance and a lower Q for the tuned circuit. A different Q results in a different sharpness of resonance and a differently shaped bias waveform to be applied as an A. S. C. voltage to amplifier 2 of Fig. 1.

It is to be noted that, as previously stated, the maximum value of the bias waveform must be kept constant as its shape varies. Thus the envelope of the sinusoidal voltage waveform across the tuned circuit 24—25 must change in shape while keeping the same maximum amplitude. This maximum amplitude occurs at the resonant frequency of the tuned circuit. However, as the Q of the tuned circuit decreases, for example, the voltage at the resonant frequency developed across it by the transformer coupling decreases, because a lower Q for the tuned circuit 24, 25 means a smaller impedance wil be reflected back to primary 27 of transformer 28. Hence less voltage will be developed across primary 27, which is the plate load of the amplifier 23. This means that less voltage will be induced across the tuned circuit by transformer 28.

This over all decrease in amplitude is compensated for automatically because part of the output of tube 23 is directly coupled to the tuned circuit through tube 29. When the resistance of tube 29 is decreased by changing the position of the movable arm of potentiometer 34 so that the bias voltage on the grid of tube 29 is less negative, the voltage divider action between the tube and the tuned circuit causes, a higher portion of the voltage to appear across the tuned circuit. So we see that when a lower voltage is developed in the plate circuit output due to transformer action, a higher voltage is developed by voltage division, tending to keep the overall output amplitude constant.

In like manner if the Q of the tuned circuit increases due to increase in plate resistance of tube 29, a higher output results from the transformer action and a lower output from the voltage division between tube 29 and the tuned circuit.

If desirable, the regulation effected by the transformer circuit may be varied by controlling the gain of the input amplifier 23 simultaneously with the resistance tube 29 as shown in the embodiment of figure 2. This is conveniently accomplished by applying the variable bias voltage of the resistance tube to an electrode of the input amplifier tube to vary the gain thereof. In the circuit shown, a control voltage is applied to the grid 22 of tube 23 to decrease the compensating action of the output circuit.

Accordingly, a portion of the bias to tube 29 from potentiometer 34 is applied to tube 23, changing its gain. If the bias is decreased, decreasing the plate resistance of tube 29 and resulting in a lower Q, less output will be developed across the tuned circuit due to transformer action, as before. Voltage division between tube 29 and the tuned circuit will increase the output. The smaller bias across tube 23 will increase its amplification, further increasing the A. S. C. output, resulting in the total necessary amplitude increase.

Condenser 35 between grid and cathode of tube 29 is to overcome the Miller effect by increasing the capacity so that the reflected capacity is only a very small percentage of the total capacity between grid and cathode thus preventing detuning.

In cases where bandpass compensation is desired in an adaptor to be used with a companion receiver, potentiometer contact 36 is used to set the overall amplitude of the A. S. C. voltage for one condition of receiver selectivity. The overall amplitude will adjust itself automatically as the A. S. C. waveform is changed to compensate for other conditions of receiver selectivity.

It will be understood that the embodiment shown of the present invention is exemplary only and that the limits thereof are to be determined with reference to the appended claims.

The invention described herein may be manufactured and used by or for the Government of the United States of America for governmental purposes without the payment of any royalties thereon or therefor.

What is claimed is:

1. An amplitude stabilization system comprising the combination of a radio receiver circuit having a non uniform radio-frequency response curve over the band of frequencies to be received, a signal transmission path coupled to the output of said receiver circuit for relaying the signals therefrom, the transfer efficiency of said path being inversely proportional to the magnitude of a control voltage fed thereto, a resonant circuit fixedly tuned to a first frequency, an electron discharge device varying the selectivity of said resonant circuit, a source of variable frequency voltage coupled to the input of said resonant circuit, means coupled to said voltage source for periodically varying said voltage source above and below said first frequency, and means coupled between the output of said resonant circuit and said transmission path for developing a control voltage whose magnitude is proportional to the amplitude of the alternating voltage variations developed in said resonant circuit by said source of variable frequency voltage and for coupling the control voltage to said path to control the transfer efficiency thereof.

2. An amplitude stabilization system comprising the combination of a radio receiver circuit having a radio frequency response curve which varies in the same direction on either side of a first given frequency, a radio frequency amplifier coupled to the output of said receiver circuit, the gain of said amplifier being inversely proportional to the magnitude of a control voltage fed thereto, a resonant circuit fixedly tuned to a second frequency, an electron discharge device varying the selectivity of said resonant circuit, a source of variable frequency voltage coupled to the input of said resonant circuit, means coupled to said voltage source for periodically varying the frequency of said source above and below said second frequency, a first means coupled between the output of said resonant circuit and said amplifier for developing a direct current control voltage whose magnitude is proportional to the amplitude of the alternating voltage variations developed in said resonant circuit by said source of variable frequency voltage and for coupling the control voltage to said radio frequency amplifier.

3. An amplitude stabilization system comprising the combination of a radio receiver circuit having a radio frequency response curve which varies in the same direction on either side of a first given frequency, a radio frequency amplifier coupled to the output of said receiver circuit, the gain of said amplifier being inversely proportional to the magnitude of a control voltage fed thereto, a resonant circuit fixedly tuned to a second frequency different from said first frequency, an electron discharge device varying the selectivity of said resonant circuit, a source of variable frequency voltage coupled to the input of said resonant circuit, means coupled to said voltage source for periodically varying the frequency of said source above and below said second frequency, a first means coupled between the output of said resonant circuit and said amplifier for developing a direct current control voltage whose magnitude is proportional to the amplitude of the alternating voltage variations developed in said resonant circuit by said source of variable frequency voltage and for coupling the control voltage to said radio frequency amplifier, a third means coupled to said amplifier output and to said source of variable frequency voltage for heterodyning the frequencies thereof, a fourth means tuned to one of the heterodyne frequencies coupled to said third means.

4. An amplitude stabilization system for use with a radio receiver having a radio frequency response curve which varies in the same direction on either side of a first given frequency comprising the combination of a radio frequency amplifier whose gain is inversely proportional to the magnitude of a control voltage fed thereto, a resonant circuit fixedly tuned to a second frequency, said resonant circuit including a transformer having a primary and secondary winding, an electron discharge device having a control electrode connected between said primary and secondary winding and a capacitor coupled across said secondary winding, means associated with said electron discharge device for varying the bias applied to the control electrode thereof whereas to vary the resistance of said device thereby varying the selectivity of said resonant circuit, a source of variable frequency voltage coupled to the primary of said transformer, means coupled to said voltage source for periodically varying said source above and below said second frequency, a first means coupled between the secondary circuit of said transformer and said amplifier for developing a direct current control voltage whose magnitude is proportional to the amplitude of the alternating voltage variations developed in said resonant circuit by said source of variable frequency voltage and for coupling the control voltage to said radio frequency amplifier.

5. An amplitude stabilization system comprising the combination of a radio receiver circuit having a radio frequency response curve which varies in the same direction on either side of a first given frequency, a radio frequency amplifier coupled to the output of said receiver circuit, the gain of said amplifier being inversely proportional to the magnitude of a control voltage fed thereto, a resonant circuit fixedly tuned to a second frequency, said resonant circuit including a variable resistance means in the form of an electron discharge device, means for varying said resistance means whereby to vary the sharpness of the selectivity curve of said resonant circuit, a source of variable frequency voltage coupled to the input of said resonant circuit, means coupled to said voltage source for periodically varying the frequency of said source above and below said second frequency, a first means coupled between the output of said resonant circuit and said amplifier for developing a direct current control voltage whose magnitude is proportional to the amplitude of the alternating voltage variations developed in said resonant circuit by said source of variable frequency voltage and for coupling the control voltage to said radio frequency amplifier.

6. An amplitude stabilization system comprising the combination of a radio receiver circuit having a radio frequency response curve which varies in the same direction on either side of a first given frequency, a radio frequency amplifier coupled to the output of said receiver circuit, the gain of said amplifier being inversely proportional to the magnitude of a control voltage fed thereto, a resonant circuit tuned to a second frequency, said resonant circuit including an inductance and capacitance in parallel circuit relation to each other and to a series circuit comprising an electron discharge device having a control electrode and a pair of input terminals, means associated with said electron discharge device for varying the bias applied to said control electrode thereby varying the resistance of said electron discharge device which in turn varies the selectivity of said resonant circuit, a source of variable frequency voltage coupled to said input terminals, means coupled to said voltage source for periodically varying said source above and below said second frequency, a first means coupled between the output of said resonant circuit and said amplifier for developing a direct current control voltage whose magnitude is proportional to the amplitude of the alternating voltage variations developed in said resonant circuit by said source of variable frequency voltage and for coupling the control voltage to said radio frequency amplifier.

7. An amplitude stabilization system comprising the combination of a radio receiver circuit having a radio frequency response curve which varies in the same direction on either side of a first given frequency, a radio frequency amplifier coupled to the output of said receiver circuit, the gain of said amplifier being inversely proportional to the magnitude of a control voltage fed thereto, a resonant circuit fixedly tuned to a second frequency, an electron discharge device to vary the selectivity of said resonant circuit, a source of variable frequency voltage coupled to the input of said resonant circuit, means coupled to said voltage source for periodically varying said source above and below said second frequency, a first means coupled between the output of said resonant circuit and said amplifier for developing a direct current control voltage whose magnitude is proportional to the amplitude of the alternating voltage variations developed in said resonant circuit by said source of variable frequency voltage and for coupling the control voltage to said radio frequency amplifier, a third means coupled to said amplifier output and to a source of periodically varying frequency voltage for heterodyning the frequencies thereof, a fourth means tuned to one of the heterodyne frequencies coupled to said third means.

CHARLES E. YOUNG.

REFERENCES CITED

The following references are of record in the file of this patent:

UNITED STATES PATENTS

| Number | Name | Date |
|---|---|---|
| 2,025,400 | Ring | Dec. 24, 1935 |
| 2,054,839 | Starrett | Sept. 22, 1936 |
| 2,080,115 | Dean | May 11, 1937 |
| 2,112,595 | Farnham | Mar. 29, 1938 |
| 2,167,400 | Farrington | July 25, 1939 |
| 2,262,149 | Slonczewski | Nov. 11, 1941 |
| 2,266,670 | Winfield | Dec. 16, 1941 |
| 2,381,940 | Wallace | Aug. 14, 1945 |
| 2,388,590 | Zanpacosta | Nov. 6, 1945 |
| 2,514,443 | Crosby | July 11, 1950 |